(12) United States Patent
Suzuki (10) Patent No.: US 7,283,665 B2
(45) Date of Patent: Oct. 16, 2007

(54) ENCODING AND DECODING DATA TO RENDER 2D OR 3D IMAGES

(75) Inventor: Nobuyuki Suzuki, Ibaraki (JP)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 10/417,423

(22) Filed: Apr. 15, 2003

(65) Prior Publication Data

US 2004/0208362 A1    Oct. 21, 2004

(51) Int. Cl.
G06K 9/00    (2006.01)

(52) U.S. Cl. .............. 382/166; 382/162; 382/163

(58) Field of Classification Search .......... 382/166, 382/164, 167, 232, 233, 154, 162, 163; 345/550, 345/577, 604, 500; 358/520, 530, 448, 515
See application file for complete search history.

(56) References Cited

U.S. PATENT DOCUMENTS 4,564,915 A * 1/1986 Evans et al. .............. 345/550
5,032,903 A * 7/1991 Suzuki et al. .............. 358/530
5,187,570 A * 2/1993 Hibi et al. .................. 358/520
5,416,890 A * 5/1995 Beretta ....................... 345/590
6,674,895 B2 * 1/2004 Rafii et al. .................. 382/154

FOREIGN PATENT DOCUMENTS

JP    352084915 A   *   7/1977

* cited by examiner

Primary Examiner—Anh Hong Do (57) ABSTRACT

A method of encoding data comprising: a) converting a first data set, representing pixels of a first image in an RGB format, to a second data set, representing pixels of the first image in an intensity-color format; b) discarding color data from the second data set to create a reduced second data set; c) converting a third data set, representing pixels of a second image in an RGB format, to a fourth data set, representing pixels of the second image in the intensity-color format; d) discarding color data from the fourth data set to create a reduced fourth data set; and e) combining the reduced second data set and the reduced fourth data set. A method of decoding to produce 3D image data and a method of decoding to produce 2D image data.

64 Claims, 7 Drawing Sheets

Fig. 2B final encoded memory image

| Y11[L] | U11[L] | Y11[L] | V11[L] | Y11[R] | U11[R] | Y11[R] | V11[R] | Y13[L] | U13[L] | Y13[L] |
|---|---|---|---|---|---|---|---|---|---|---|
| Y21[L] | Y12[L] | Y22[L] | | Y21[R] | Y12[R] | Y22[R] | | Y23[L] | Y14[L] | Y24[L] |
| ... | ... | ... | ... | ... | ... | ... | ... | ... | ... | ... |

$$\begin{pmatrix} R \\ G \\ B \end{pmatrix} = \begin{pmatrix} 1.00000 & 1.40200 & 0.00000 \\ 1.00000 & -0.71414 & -0.34414 \\ 1.00000 & 0.00000 & 1.77200 \end{pmatrix} \begin{pmatrix} Y \\ U \\ V \end{pmatrix}$$

*Fig. 3A*

$$\begin{pmatrix} Y \\ U \\ V \end{pmatrix} = \begin{pmatrix} 0.29900 & 0.58700 & 0.11400 \\ 0.50000 & -0.41869 & -0.08131 \\ -0.16874 & -0.33126 & 0.50000 \end{pmatrix} \begin{pmatrix} R \\ G \\ B \end{pmatrix}$$

ENCODING AND DECODING DATA TO RENDER 2D OR 3D IMAGES

TECHNICAL FIELD

Embodiments of the present invention relate to encoding and decoding data to render 2D or 3D images.

BACKGROUND OF THE INVENTION

Color images can be presented in a number of different color spaces (formats). A popular color space for representation is RGB, which corresponds to modern mechanisms for image capture and image display.

An image is divided into an N row×M column array of picture elements (pixels). Each pixel is divided into three sub-pixels. There is a red sub-pixel for red light, a green sub-pixel for green light and a blue sub-pixel for blue light. The brightness and color at a pixel is dependent upon the intensity of blue light at the blue sub-pixel, the intensity of green light at the green sub-pixel and the intensity of blue light at the blue sub-pixel. The respective intensities of the red, green and blue light at a pixel can be represented as a vector (R, G, B) or signal having red, green, and blue signal components (red-green-blue format).

Currently available optical sensors for digital cameras produce output data in this so called RGB format. Currently available digital display matrix blue format).devices receive data in this RGB format and covert it to an image. The display matrix has an N×M array of pixels, each of which has a red sub-pixel, a green sub-pixel and a blue sub-pixel. The light produced at a pixel corresponds to the (R, G, B) vector for that pixel.

A display device can be used to create a three dimensional image. A first optical sensor is directed towards the object to be imaged from a left perspective and a second optical sensor is directed towards the object to be imaged from a right perspective.

The image from the left perspective can be presented as an N×M data array $d_{RGB\_left}$ (n, m), of RGB vectors, where n=1, 2 . . . N and m=1, 2 . . . M i.e.

$$d_{RGB\_left}(n, m) = \{d_{R\_left}(n, m), d_{G\_left}(n, m), d_{B\_left}(n, m)\}$$
$$= \{Rnm[L], Gnm[L], Bnm[L]\}$$

where Rnm[L], represents the intensity of the red pub-pixel, for the pixel at row n, column m from the left perspective, Gnm[L], represents the intensity of the green pub-pixel, for the pixel at row n, column m from the left perspective, Bnm[L], represents the intensity of the blue pub-pixel, for the pixel at row n, column m from the left perspective.

The image from the right perspective can be presented as an N×M data array $d_{RGB\_right}$ (n, m), of RGB vectors, where n=1, 2 . . . N and m=1, 2 . . . M i.e.

$$d_{RGB\_right}(n, m) = \{d_{R\_right}(n, m), d_{G\_right}(n, m), d_{B\_right}(n, m)\}$$
$$= \{Rnm[R], Gnm[R], Bnm[R]\}$$

where Rnm[R], represents the intensity of the red pub-pixel, for the pixel at row n, column m from the left perspective, Gnm[R], represents the intensity of the green pub-pixel, for the pixel at row n, column m from the left perspective, Bnm[R], represents the intensity of the blue pub-pixel, for the pixel at row n, column m from the left perspective.

Figure 1:
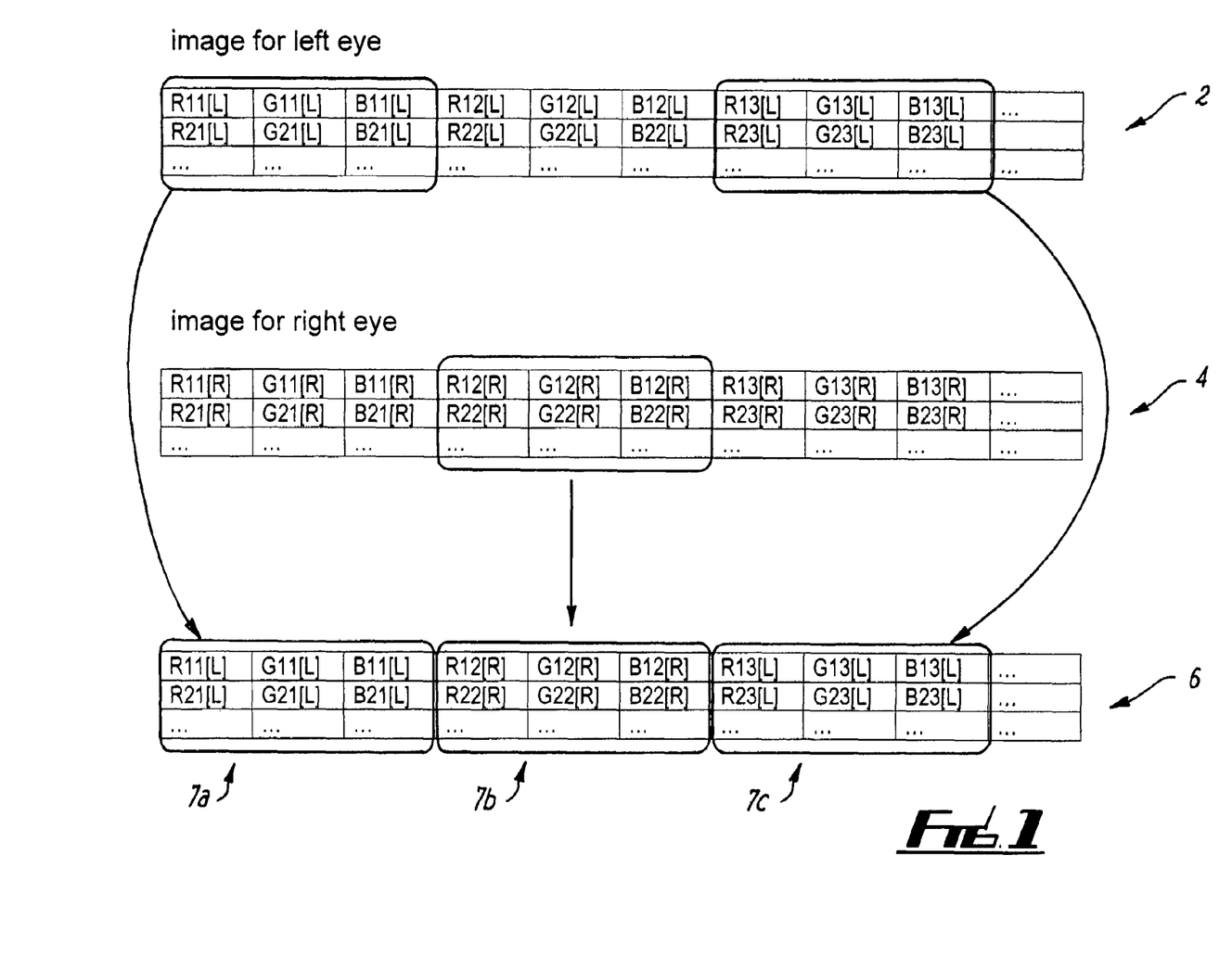
FIG. 1 illustrates data suitable for rendering a 3D image.

A combined N×M data array $d_{RGB\_combined}$ (n, m), of RGB vectors, where n=1, 2 . . . N and m=1, 2 . . . M is formed from the data array $d_{RGB\_left}$ (n, m), and the data array $d_{RGB\_right}$ (n, m) as shown in FIG. 1. In the Figure, the data array $d_{RGB\_left}$ (n, m) is indicated by reference numeral 2, the data array $d_{RGB\_right}$ (n, m) is indicated by reference numeral 4, and the data array $d_{RGB\_combined}$ (n, m) is indicated by reference numeral 6.

The combined N×M data array $d_{RGB\_combined}$ (n, m) has columns of vectors 7a, 7b and 7c which are taken alternately from $d_{RGB\_left}$ (n, m), and $d_{RGB\_right}$ (n, m), $$d_{RGB\_combined}(n, m) = d_{RGB\_left}(n, m[\text{odd}]) + d_{RGB\_right}(n, m[\text{even}])$$

The combined N×M array $d_{RGB\_combined}$ (n, m), of RGB vectors, is used to create a three dimensional image on a display device, such as an auto-stereoscopic 3D display device, which makes use of the human 3D image recognition mechanism of eye parallax.

A problem arises if one wants to send data representing an image than can be used on a '2D display device' as well as a '3D display device'.

One solution to this problem is to provide data representing the image from the right perspective (N×M data array $d_{RGB\_left}$ (n, m) of RGB vectors) and data representing the image from the left perspective (N×M data array $d_{RGB\_right}$ (n, m), of RGB vectors) to all devices. The '2D display device' would use only the data representing the image from the right perspective or only the data representing the image from the left perspective. The '3D display device' would create and use the combined N×M array $d_{RGB\_combined}$ (n, m), of RGB vectors.

However, this requires the provision of a significant amount of data to the display device. This is undesirable particularly if the mechanism for supply is of limited bandwidth, such as a wireless connection.

BRIEF SUMMARY OF THE INVENTION

The various aspects of the present invention are defined in the attached claims.

Figure 2A:
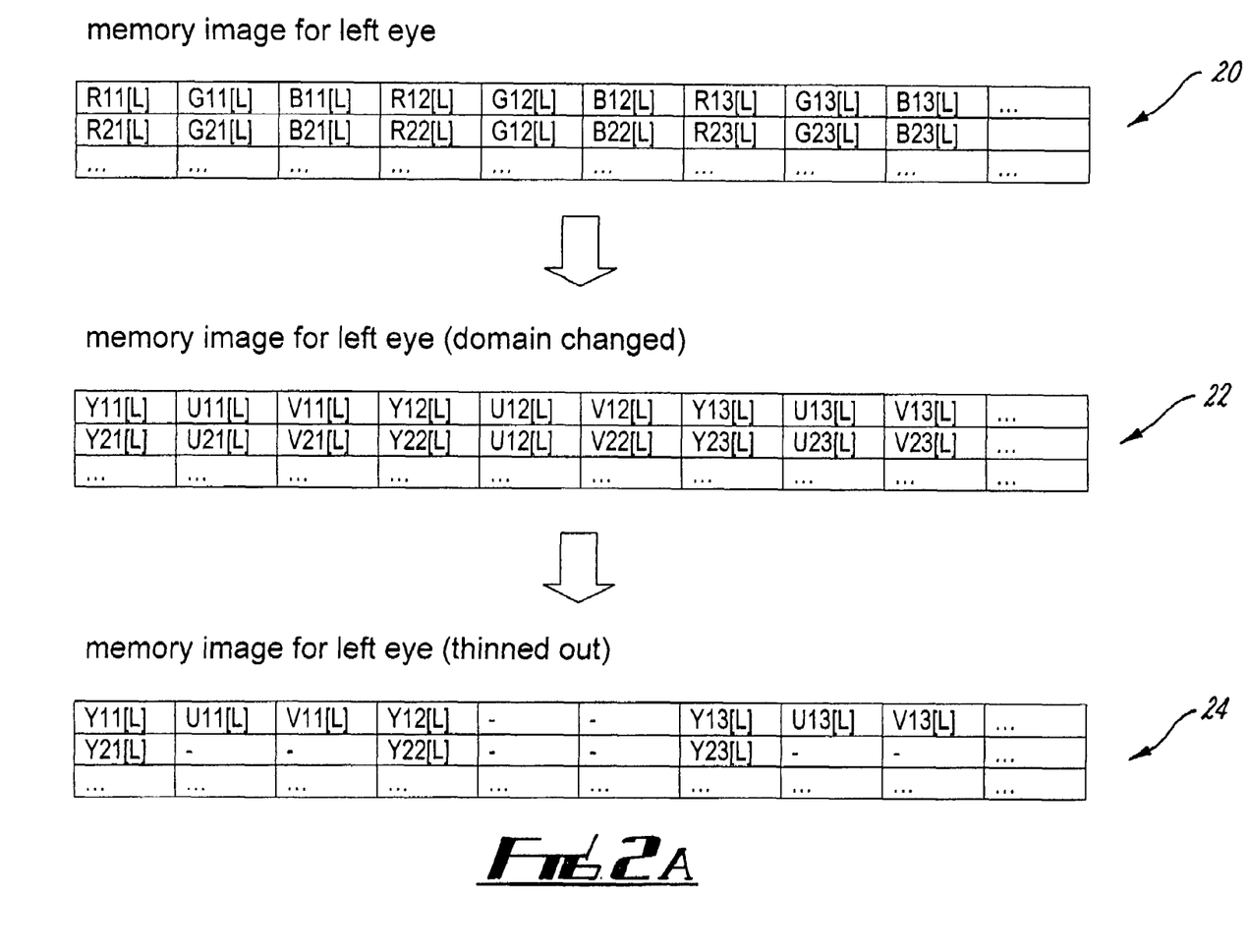
FIGS. 2A, 2B and 2C illustrate one method of encoding data.
Figure 2B:
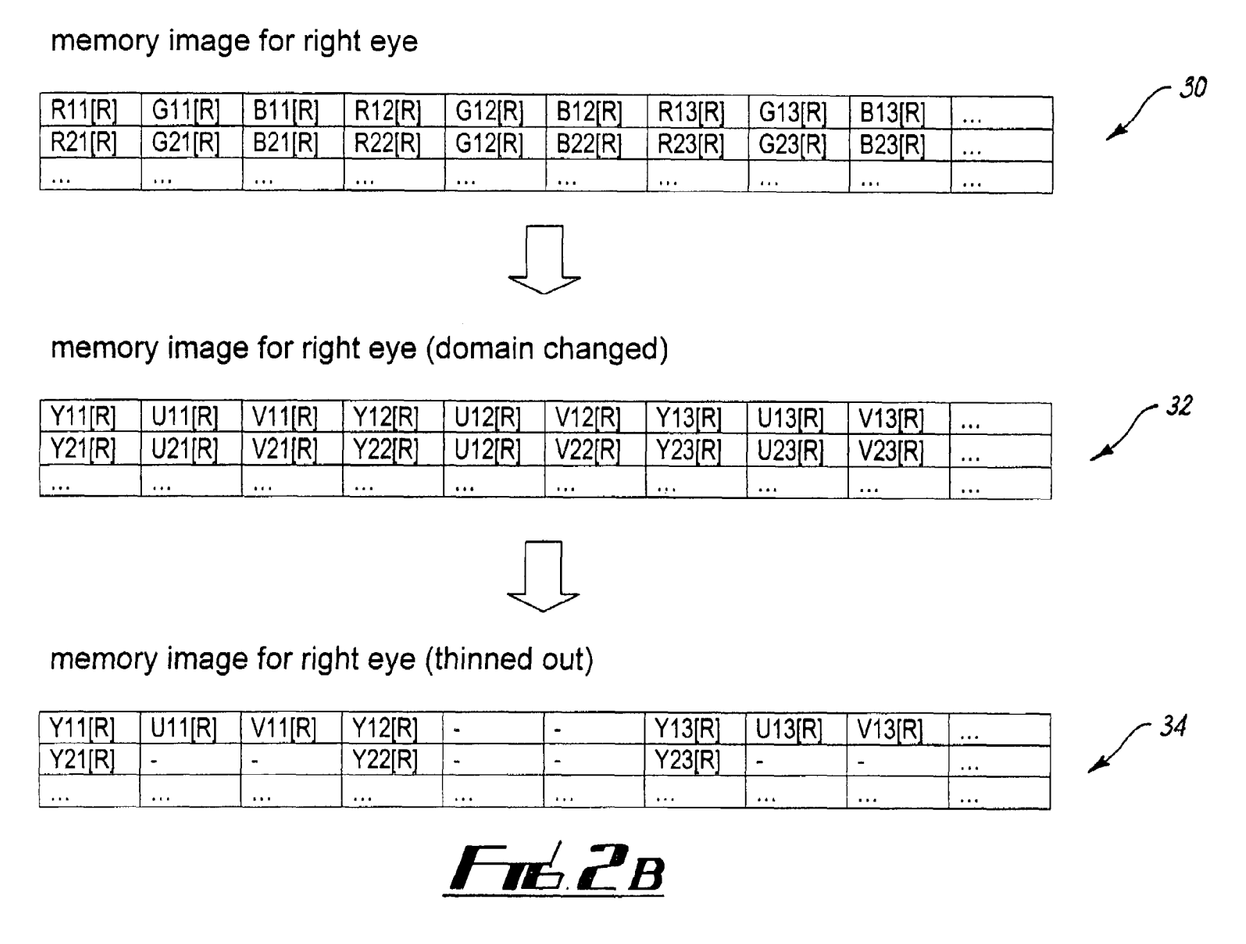
Figure 2C:
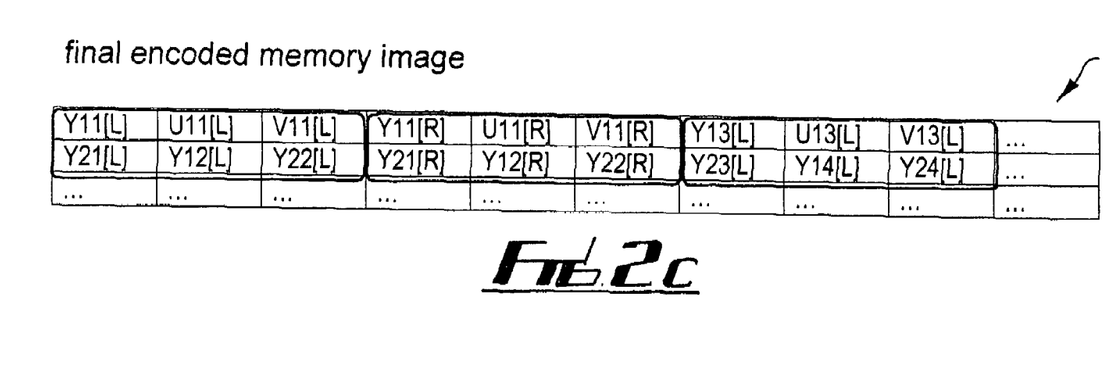

As an example, in one embodiment of the invention, there is provided a method of encoding data (FIGS. 2A, 2B, 2C) comprising the steps of:

a) converting a first data set (20), representing pixels of a first image in an RGB format, to a second data set (22), representing pixels of the first image in an intensity-color format;

b) discarding color data from the second data set to create a reduced second data set (24);

c) converting a third data set (30), representing pixels of a second image in an RGB format, to a fourth data set (32), representing pixels of the second image in the intensity-color format;

d) discarding color data from the fourth data set to create a reduced fourth data set (34); and e) combining the reduced second data set and the reduced fourth data set.

Another embodiment of the invention provides a data encoder 102 comprising:

an input (103) for receiving a first data set (20), representing pixels of a first image in an RGB format, and for receiving a third data set (30), representing pixels of a second image in the RGB format; and conversion means (117) for converting the first data set (20) to a second data set (22), representing pixels of the first image and having separate intensity data (Y) and color data (UV) and for converting the third data set (30) to a fourth data set (32), representing pixels of the second image and having separate intensity data (Y) and color data (UV); and processing means (117) for discarding color data (UV) substantially equally from the second data set (22) and the fourth data set (32) before combining them.

Figure 4:
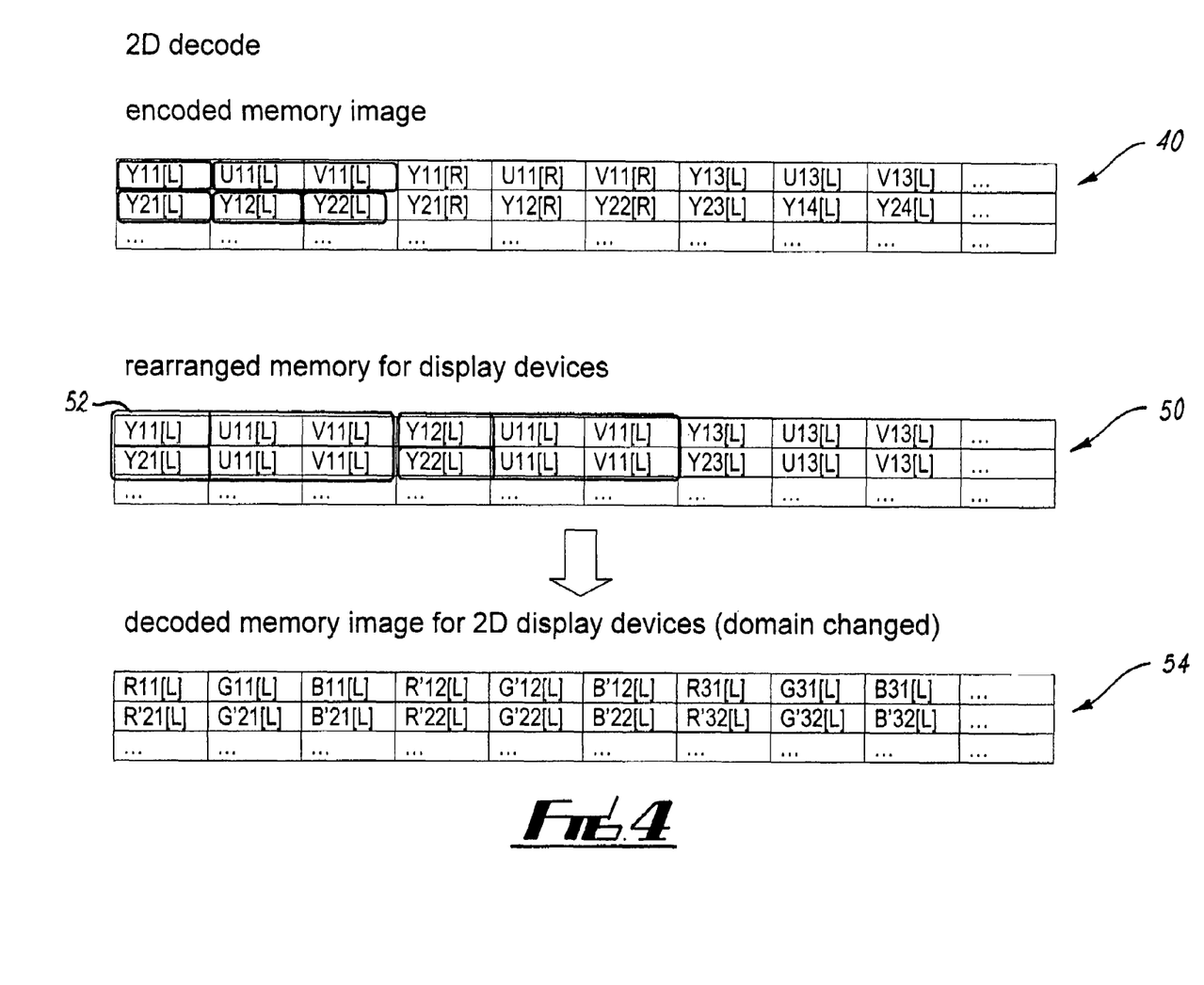
FIG. 4 illustrates one method of decoding data to render a 2D image.

Another embodiment of the invention provides a method (FIG. 4) of producing 2D image data (50, 54) from a data set (40) that includes a first set of pixel data, for a first image in an intensity-color format, including first intensity data for a plurality of pixels and first color data for a first sub-set of the plurality of pixels and a second set of pixel data, for a second image in the intensity-color format, including second intensity data for the plurality of pixels and second color data for a second sub-set of the plurality of pixels, comprising the step of:

creating a third set (50) of pixel data in the intensity-color format for the first image, including intensity data and color data for each of the plurality of pixels, using the first intensity data and the first color data only.

Another embodiment of the invention provides a decoder for producing 2D image an input (115) for receiving a data set (40) that includes a first set of pixel data, for a first image in an intensity-color format, including first intensity data for a plurality of pixels and first color data for a first sub-set of the plurality of pixels and a second set of pixel data, for a second image in the intensity-color format, including second intensity data for the plurality of pixels and second color data for a second sub-set of the plurality of pixels; and processing means (117) for creating a third set (50) of pixel data in the intensity-color format for the first image, including intensity data and color data for each of the plurality of pixels, using the first intensity data and the first color data only.

Figure 5:
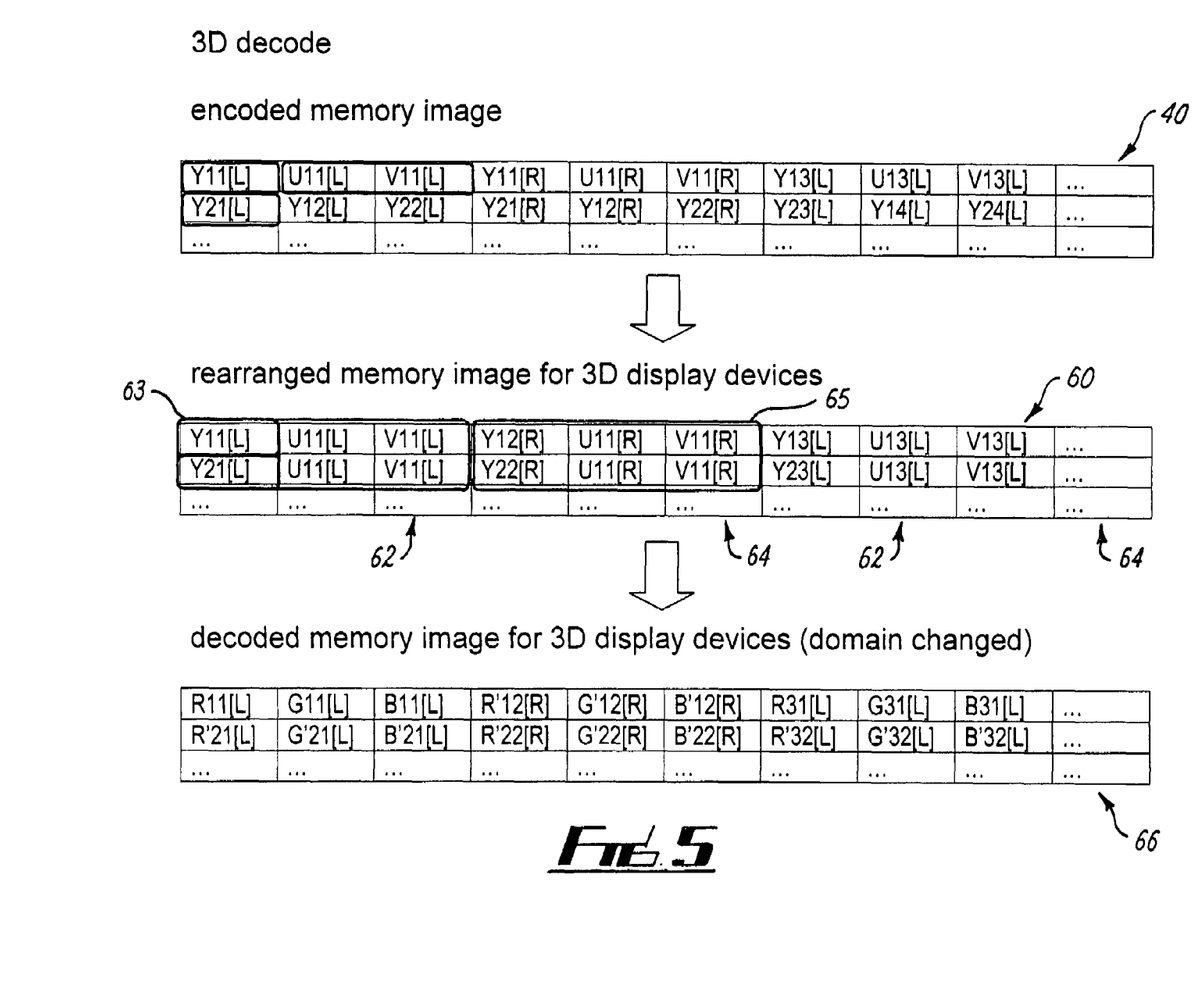
FIG. 5 illustrates one method of decoding data to render a 3D image.

Another embodiment of the invention provides a method (FIG. 5) of producing a 3D image data (64, 66) from a data set (40) that comprises a first set of pixel data in an intensity-color format for a first image, including first intensity data for a plurality of pixels and first color data for a first sub-set of the plurality of pixels and a second set of pixel data in the intensity-color format for a second image including second intensity data for the plurality of pixels and second color data for a second sub-set of the plurality of pixels, comprising the steps of:

creating a third set (62) of pixel data, for the first image in the intensity-color format, including intensity data and color data for each one of a third sub-set of the plurality of pixels, using that part of the first intensity data associated with the third sub-set of the plurality of pixels and the first color data; and creating a fourth set (64) of pixel data for the second image, in a intensity-color format, including intensity data and color data for each one of a fourth sub-set of the plurality of pixels, using that part of the second intensity data associated with the fourth sub-set of the plurality of pixels and the second color data.

Another embodiment of the invention provides a decoder for producing a 3D image comprising: an input (115) for receiving a data set (40) that comprises a first set of pixel data in an intensity-color format for a first image, including first intensity data for a plurality of pixels and first color data for a first sub-set of the plurality of pixels and a second set of pixel data in the intensity-color format for a second image including second intensity data for the plurality of pixels and second color data for a second sub-set of the plurality of pixels; and processing means (117) for creating a third set (62) of pixel data, for the first image in the intensity-color format, including intensity data and color data for each one of a third sub-set of the plurality of pixels, using that part of the first intensity data associated with the third sub-set of the plurality of pixels and the first color data and creating a fourth set (64) of pixel data for the second image, in a intensity-color format, including intensity data and color data for each one of a fourth sub-set of the plurality of pixels, using that part of the second intensity data associated with the fourth sub-set of the plurality of pixels and the second color data.

Another embodiment of the invention provides a memory (106, 114) storing a data set (40) comprising:

a first set of pixel data for a first image in a intensity-color format, including first intensity data for a plurality of pixels arranged as an array having rows and columns and first color data for a first sub-set of the plurality of pixels; and a second set of pixel data in the intensity-color color-space for a second image including second intensity data for the same plurality of pixels and second color data for a second sub-set of the plurality of pixels.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

One method of encoding data is illustrated in FIGS. 2A, 2B and 2C.

FIG. 2A illustrates a first RGB data set 20. This is an N×M array $d_{RGB\_left}$ (n, m) of RGB vectors, as described previously. Each vector represents a pixel of an image from a left perspective. Thus the first RGB data set 20 is a memory image for a viewer's left eye.

$$d_{RGB\_left}(n, m) = \{d_{R\_left}(n, m), d_{G\_left}(n, m), d_{B\_left}(n, m)\}$$

$$= \{Rnm[L], Gnm[L], Bnm[L]\}$$

The first RGB data set 20 is converted from an RGB format to an intensity-color format, such as a luminance-chrominance format e.g. YUV, i.e., having one intensity component and two color components. The N×M array $d_{RGB\_left}$ (n, m) is converted vector by vector to the N×M array $d_{YUV\_left}$ (n, m) using the transformation illustrated in FIG. 3B. The N×M array $d_{YUV\_left}$ (n, m) is illustrated in FIG. 2A as first YUV data set 22. The image is consequently still represented as an array of pixels but using a different color-space.

The conversion can be expressed as:

$$d_{\text{RGB\_left}}(n, m) \rightarrow D_{\text{YUV\_left}}(n, m) = \{D_{\text{Y\_left}}(n, m), D_{\text{UV\_left}}(n, m)\}$$

$$= Ynm[L], Unm[L], Vnm[L]$$

where $D_{YUV\_left}$ (n, m) is the first YUV data set 22, $D_{Y\_left}$ (n, m) represents the intensity (luminance) data of the first YUV data set 22, and $D_{UV\_left}$ (n, m) the color (chrominance) data of the first YUV data set 22. Ynm[L] represents the intensity (luminance) component of the YUV vector in the intensity-color space for pixel (n, m). Unm[L] and Vnm[L] respectively represent first and second color (chrominance) components of the YUV vector in the intensity-color space for pixel (n,m).

Color data is then discarded from the first YUV data set 22 to create a reduced first YUV data set 24. In this example, the color data of pixels of alternate rows and pixels of alternate columns is discarded. The color components Unm[L] and Vnm[L] are discarded for n=2, 4, . . . , for all m and for m=2, 4, 6 . . . for all n. The reduced first YUV data set 24 can be expressed as $D_{Y\_left}$ (n, m), $D_{UV\_left}$ (n[odd], m[odd]), where n[odd] indicates only odd values of n and m[odd] indicates only odd values of m. That is, the reduced first YUV data set 24 retains all of the intensity data for each of the pixels from the first YUV data set 22, but has discarded three quarters of the color data. The ration of intensity data to color data is thus changed from 1:2 to 2:1.

FIG. 2B illustrates a second RGB data set 30. This is an N×M array $d_{RGB\_right}$ (n, m) of RGB vectors, as described previously. Each vector represents a pixel of an image from a right perspective. Thus the second RGB data set 30 is a memory image for a viewer's right eye.

$$d_{\text{RGB\_right}}(n, m) = \{d_{\text{R\_right}}(n, m), d_{\text{G\_right}}(n, m), d_{\text{B\_right}}(n, m)\}$$

$$= \{Rnm[R], Gnm[R], Bnm[R]\}$$

The second RGB data set 30 is converted from an RGB format to an intensity-color format, such as a luminance-chrominance format e.g. YUV. The N×M array $d_{RGB\_right}$ (n, m) is converted vector by vector to the N×M array $d_{YUV\_right}$ (n, m) using the transformation illustrated in FIG. 3B. The N×M array $d_{YUV\_right}$ (n, m) is illustrated in FIG. 2B as second YUV data set 32. The image is consequently still represented as an array of pixels but using a different color-space.

The conversion can be-expressed as:

$$d_{\text{RGB\_right}}(n, m) \rightarrow D_{\text{YUV\_right}}(n, m) = \{D_{\text{Y\_right}}(n, m), D_{\text{UV\_right}}(n, m)\}$$

$$= Ynm[R], Unm[R], Vnm[R]$$

where $D_{YUV\_right}$(n, m) is the second YUV data set 32, $D_{Y\_right}$(n, m) represents the intensity (luminance) data of the second YUV data set 32, and $D_{UV\_right}$(n, m) the color (chrominance) data of the second YUV data set 32. Ynm[R] represents the intensity (luminance) component of the YUV vector in the intensity-color space for pixel (n, m). Unm[R] and Vnm[R] respectively represent first and second color (chrominance) components of the YUV vector in the intensity-color space for pixel (n,m).

Color data is then discarded from the second YUV data set 32 to create a reduced second YUV data set 34. In this example, the color data of pixels of alternate rows and pixels of alternate columns is discarded. The color components Unm[R] and Vnm[R] are discarded for n=2, 4, . . . , for all m and for m=2, 4, 6 . . . for all n. The reduced second YUV data set 34 can be expressed as $D_{Y\_right}$(n, m), $D_{UV\_right}$(n[odd], m[odd]), where n[odd] indicates only odd values of n and m[odd] indicates only odd values of m. That is, the reduced second YUV data set 34 retains all of the intensity data for each of the pixels from the second YUV data set 32, but has discarded three quarters of the color data. The ratio of intensity data to color data is thus changed from 1:2 to 2:1.

The reduced first YUV data set 24 and the reduced second YUV data set 34 are then combined to form a combined YUV data set 40 as illustrated in FIG. 2C. The combined YUV data set 40 is an N×3M array $d_{RGB\_right}$ (n, m) of intensity and color components as opposed to an N×M array of YUV vectors. There is an intensity component for each of the 2NM pixels (NM for the left image and NM for the right image). There are additionally first and second color components U and V for a sub-set of the 2NM components. There are a pair of first and second color components for every two-column by two-row group of pixels. There is consequently a total of 3NM components which is the same size as an N×M array of YUV vectors.

The combined YUV data set 40 may be expressed as:

$$D_{YUV\_combined}(n, m) = D_{YUV\_left}(n, m), \text{ for } n=1, 3, 5 \ldots \& m=1, 3, 5 \ldots$$

$$D_{YUV\_combined}(n, m) = D_{YUV\_right}(n, m-1]), \text{ for } n=1, 3, 5 \ldots \& m=2, 4, 6 \ldots$$

$$D_{YUV\_combined}(n, m) = D_{Y\_left}(n, m), D_{Y\_left}(n-1, m+1),$$

$$D_{Y\_left}(n, m+1)$$

$$= Ynm[L], Yn-1m+1[L], Ynm+1[L]$$

for $n = 2, 4, 6 \ldots \& m = 1, 3, 5 \ldots$ $$D_{YUV\_combined}(n, m) = D_{Y\_right}(n, m-1), D_{Y\_right}(n-1, m),$$

$$D_{Y\_right}(n, m)$$

$$= Ynm-1[L], Yn-1m[L], Ynm[L]$$

for $n = 2, 4, 6 \ldots \& m = 2, 4, 6 \ldots$

It is apparent that the components are grouped according to the perspective they relate to and to which 2 row by 2 column group of pixels they relate to. The odd rows contain YUV vectors and the even rows contain intensity components only.

A method of producing 2D image data from the combined YUV data set 40 is illustrated in FIG. 4. The N×3M array of components, the combined YUV data set 40, is converted into an N×M array of vectors 50 representing an approximation of the image from the left perspective in the YUV color space. Each of NM pixels has an associated vector which has an intensity component (Y) and two color components (UV).

The N×M array of vectors 50 is created by re-using the color components of the vector for one pixel, in the vectors created for adjacent pixels. For example, in the group of vectors 52 for n=1,2 and m=1,2, the color components U11[L], V11[L] of the vector {Y11[I], U11[L], V11[L]} for pixel n=1, m=1 are reused in the vectors for pixels (1,2), (2,1) and (2,2). Each created vector has its own individual intensity component Ynm[L], taken from the combined YUV data set 40. The ratio of intensity data to color data is changed from 2:1 in the combined YUV data set 40 to 1:2 in the N×M array 50 of vectors by re-using color data.

Figure 3A:
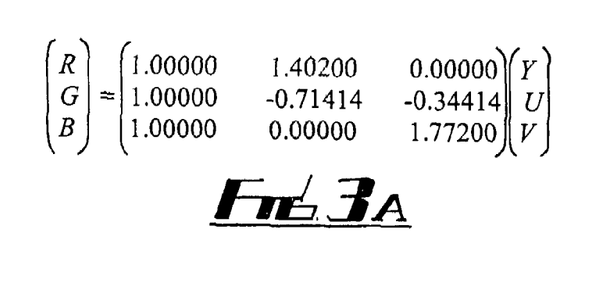
FIGS. 3A and 3B illustrate vector transformations.
Figure 3B:
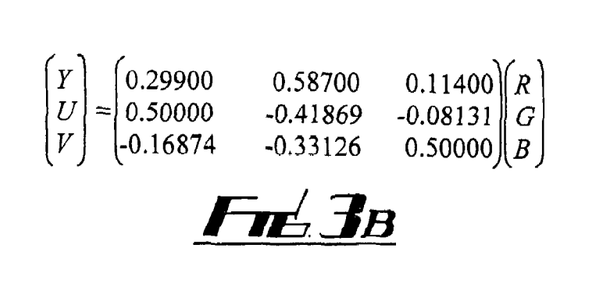

The N×M array of YUV vectors is then transformed into an N×M array 54 of RGB vectors using the transformation illustrated in FIG. 3A. This data array 54 can be used to drive a display for example to reproduce a very close approximation of the original image from the left perspective. The use of a ' in the Figure indicates a value that is a close approximation to the equivalent value in the original source, the first RGB data set 20.

A method of producing 3D image data from the combined YUV data set 40 is illustrated in FIG. 5. The N×3M array of components (the combined YUV data set 40) is converted into an N×M array of mixed vectors 60 which is composed of the interlacing of a first N×(M/2) array 62 of vectors representing an approximation of the image from the left perspective in the YUV color space and a second N×(M/2) array 64 of vectors representing an approximation of the image from the right perspective in the YUV color space. Each of NM pixels has an associated vector which has an intensity component (Y) and two color components (UV). The N×M array of mixed vectors 60 includes the first N×(M/2) array 62 occupying odd columns and the second N×(M/2) array 64 occupying even columns.

The first N×(M/2) array 62 of YUV vectors is created by re-using the color components of the vector for one pixel in the created vector for an adjacent pixel. For example, in the group of vectors 63 for n=1,2 and m=1, the color components U11[L], V11[L] of the vector {Y11[L], U11[L], V11[L]} for pixel n=1, m=1 are reused in the vector for pixels (2,1). The created vector has its own individual intensity component Ynm[L], taken from the combined YUV data set 40. The intensity components Ynm[L] for pixels (1,2) and (2,2) of the combined YUV data set 40 are discarded, because the first N×(M/2) array 62 of YUV vectors will only occupy odd columns of the N×M array of mixed vectors 60. The ratio of intensity data to color data is changed from 2:1 in the combined YUV data set 40 to 1:2 in the N×M array 60 of mixed vectors by re-using color data and discarding intensity data.

The second N×(M/2) array 64 of YUV vectors is creating by re-using the color components of the vector for one pixel, in the created vectors for adjacent pixels. For example, in the group of vectors 65 for n=1,2 and m=2, the color components U11[R], V11[R] of the vector {Y11[R], U11[R], V11[R]} for pixel n=1, m=1 are reused in the vectors for pixels (1,2) and (2,2). The created vectors have their own individual intensity components Ynm[R], taken from the combined YUV data set 40. The vector {Y11[R], U11[R], V11[R]} for pixel (1,1) and the intensity components Ynm[L] for (n,m) (1,2) of the combined YUV data set 40 are then discarded, because the second N×(M/2) array 64 of YUV vectors will only occupy even columns of the N×M array 60 of mixed vectors. The ratio of intensity data to color data is changed from 2:1 in the combined YUV data set 40 to 1:2 in the N×M array of mixed vectors 60 by re-using and then discarding color data and discarding intensity data.

The color data for each pairing of adjacent pixels in any column of the N×M array of mixed vectors 60 is the same.

The N×M array 60 of mixed YUV vectors is then transformed into an N×M array 66 of RGB vectors using the transformation illustrated in FIG. 3A. This data array can be used to drive a display for example to reproduce in 3D a very close approximation of the original image.

Figure 6:
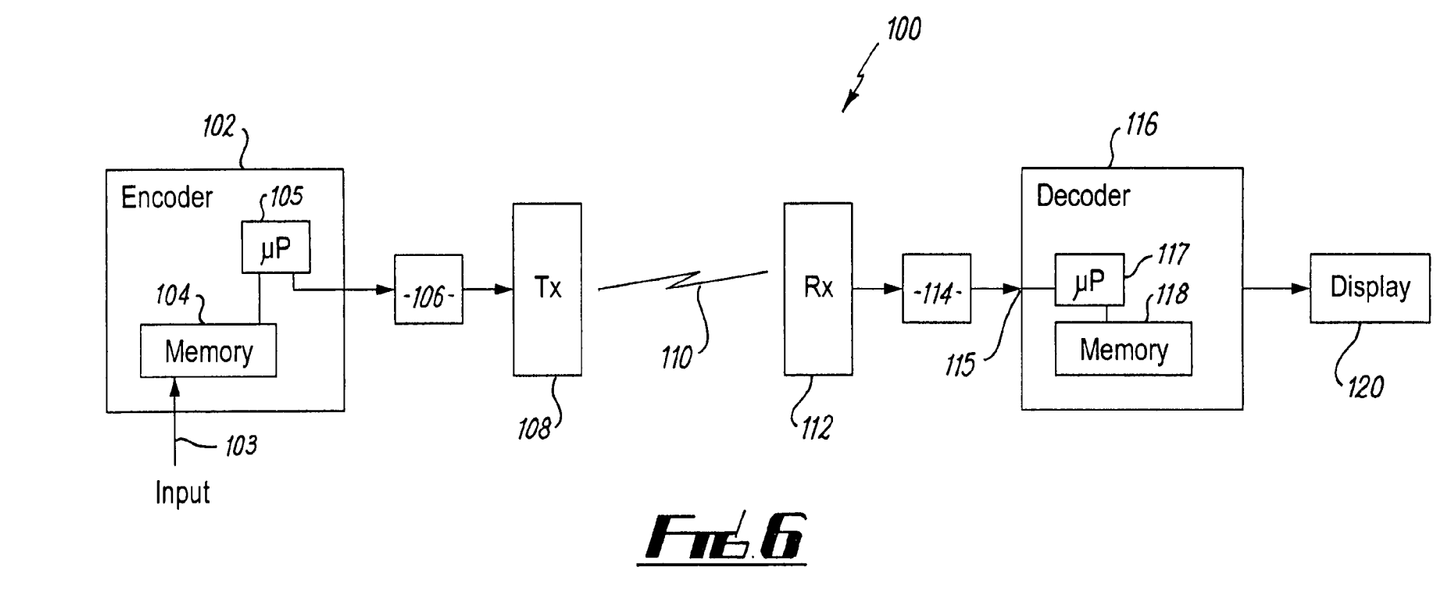
FIG. 6 illustrates a system for encoding data and decoding the encoded data to render an image on a display.

FIG. 6 illustrates a system 100 suitable for carrying out the above described method of encoding and the methods of decoding to render a 2D or 3D image. The system 100 comprises an encoder 102 having a memory 104 and processor 105, a transmission memory buffer 106, a radio transmitter 108, communication channel 110, radio receiver 112, reception memory buffer 114, decoder 116 having a memory 118 and processor 117 and a display 120.

The encoder 102 receives the first RGB data set 20 and the second RGB data set 30 via an input 103 and stores them in the memory 104. The processor 105 of the encoder 102 performs the method of encoding as described in relation to FIGS. 2A, 2B and 2C under the control of computer program instructions stored in memory 104. The result of the encoding process, the combined YUV data set 40 is stored by the encoder in the transmission memory buffer 106 for transmission. The radio transmitter 108 transmits the combined YUV data set 40 via the communications channel 110 to the radio receiver 112, which stores the received combined YUV data set 40 in the reception memory buffer 114. The processor 117 of the decoder 116 processes the combined YUV data set 40 stored in the reception memory buffer 114 and performs either the 2D decoding method as described in relation to FIG. 4 or the 3D decoding method as described in relation to FIG. 5. The operation of the processor 117 is controlled by computer program instructions stored in memory 118. The result of the decoding process is then supplied to the display 120 to reproduce an image.

Although embodiments of the present invention have been described in the preceding paragraphs with reference to various examples, it should be appreciated that modifications to the examples given can be made without departing from the spirit or scope of the invention.

The invention claimed is:

1. A method comprising:
   a) converting a first data set, representing pixels of a first image in a red-green-blue format, to a second data set, representing pixels of the first image in an intensity-color format;
   b) discarding color data from the second data set to create a reduced second data set;
   c) converting a third data set, representing pixels of a second image in the red-green-blue format, to a fourth data set, representing pixels of the second image in the intensity-color format;
   d) discarding color data from the fourth data set to create a reduced fourth data set; and
   e) combining the reduced second data set and the reduced fourth data set.

2. A method as claimed in claim 1, wherein the first data set represents the first image as viewed from a first perspective and the third data set represents the second image as viewed from a second, different perspective.

3. A method as claimed in claim 2, wherein the first and second perspectives are left and right parallax perspectives.

4. A method as claimed in claim 1, wherein discarding color data from the second data set to create a reduced second data set involves discarding color data of first predetermined pixels and
   discarding color data from the fourth data set to create a reduced fourth data set involves discarding color data of second predetermined pixels.

5. A method as claimed in claim 4, wherein the first and second predetermined pixels are the same.

6. A method as claimed in claim 4, wherein the second data set represents an N×M array of pixels having rows and columns and the first predetermined pixels include pixels of alternate rows and pixels of alternate columns of the array.

7. A method as claimed in claim 4, wherein the fourth data set represents an N×M array of pixels having rows and columns and the second predetermined pixels include pixels of alternate rows and pixels of alternate columns of the array.

8. A method as claimed in claim 1, wherein three quarters of the color data from the second data set and three quarters of the color data from the fourth data set are discarded.

9. A method as claimed in claim 1, wherein the step of discarding color data from the second data set to create a reduced second data set includes discarding three of every separate group of four adjacent pixels.

10. A method as claimed in claim 1, wherein the step of discarding color data from the fourth data set to create a reduced fourth data set includes discarding three of every separate group of four adjacent pixels.

11. A method as claimed in claim 9, wherein a group of four adjacent pixels is a two row by two column sub-array of pixels.

12. A method as claimed in claim 1, wherein the second data set includes intensity data and color data for each of the pixels and the intensity data for each pixel in the second data set is maintained in the reduced second data set, which includes intensity data for each of the pixels.

13. A method as claimed in claim 1, wherein the fourth data set includes intensity data and color data for each of the pixels and the intensity data for each pixel in the fourth data set is maintained in the reduced fourth data set, which includes intensity data for each of the pixels.

14. A method as claimed in claim 1, wherein the intensity-color format is a luminance-chrominance format.

15. A method as claimed in claim 1, wherein the intensity-color format is of one intensity component and two color components.

16. A memory storing a computer program comprising program instructions for effecting the method as claimed in claim 1.

17. Apparatus comprising:
an input for receiving a first data set, representing pixels of a first image in a red-green-blue format, and for receiving a third data set, representing pixels of a second image in the red-green-blue format; and
conversion means for converting the first data set to a second data set, representing pixels of the first image and having separate intensity data and color data and for converting the third data set to a fourth data set, representing pixels of the second image and having separate intensity data and color data; and
processing means for discarding color data substantially equally from the second data set and the fourth data set before combining them.

18. Apparatus as claimed in claim 17, wherein the processing means retains the intensity data of the second data set and the fourth data set in the combined data set.

19. A method comprising receiving a first set of pixel data, for a first image in an intensity-color format, including first intensity data for a plurality of pixels and first color data for a first sub-set of the plurality of pixels and a second set of pixel data, for a second image in the intensity-color format, including second intensity data for the plurality of pixels and second color data for a second sub-set of the plurality of pixels, and
creating a third set of pixel data in the intensity-color format for the first image, including intensity data and color data for each of the plurality of pixels, using the first intensity data and the first color data only, the third set of pixel data representing a two dimensional viewable image.

20. A method as claimed in claim 19, wherein the first and second images are each composed of the plurality of pixels.

21. A method as claimed in claim 19, wherein the first intensity data includes intensity data for each of the plurality of pixels.

22. A method as claimed in claim 19, wherein the second intensity data includes intensity data for each of the plurality of pixels.

23. A method as claimed in claim 19, wherein the first sub-set and the second sub-set include the same pixels.

24. A method as claimed in claim 19, wherein the first data set represents the first image as if viewed from a first perspective and the second data set represents the second image as if viewed from a second, different perspective.

25. A method as claimed in claim 24, wherein the first and second perspectives are left and right parallax perspectives of the same image.

26. A method as claimed in claim 19, wherein in the third set of pixel data, the color data for each group of adjacent ones of the plurality of pixels is the same.

27. A method as claimed in claim 26, wherein each group includes four pixels.

28. A method as claimed in claim 26, wherein the third data set represents an N×M array of pixels having rows and columns and each group of pixels is a two row by two column sub-array of the plurality of pixels.

29. A method as claimed in claim 19, wherein the third set of pixel data has separate individual intensity data for each of the plurality of pixels.

30. A method as claimed in claim 19, wherein a ratio of intensity data to color data in the first and second data sets is 2:1 and a ratio of intensity data to color data in the third data set is 1:2.

31. A method as claimed in claim 19, further comprising the step of converting the third set of pixel data from the intensity-color format into an RGB format.

32. A method as claimed in claim 19, wherein the intensity-color format is a luminance-chrominance format.

33. A method as claimed in claim 19, wherein the intensity-color format is of one intensity component and two color components.

34. A data structure for at least temporary storage in a computer readable medium for carrying out the steps of claim 19.

35. A memory storing a computer program comprising program instructions for effecting the method as claimed in claim 19.

36. Apoaratus comprising:
an input for receiving a data set that includes a first set of pixel data for a first image in an intensity-color format, including first intensity data for a plurality of pixels and first color data for a first sub-set of the plurality of pixels, and that includes a second set of pixel data for a second image in the intensity-color format, including second intensity data for the plurality of pixels and second color data for a second sub-set of the plurality of pixels; and
processing means for creating a third set of pixel data in the intensity-color format for the first image, including intensity data and color data for each of the plurality of pixels, using the first intensity data and the first color data only.

37. System comprising:
  an input for receiving a first data set, representing pixels of a first image in a red-green-blue format, and for receiving a third data set, representing pixels of a second image in the red-green-blue format; and
  conversion means for converting the first data set to a second data set, representing pixels of the first image and having separate intensity data and color data and for converting the third data set to a fourth data set, representing pixels of the second image and having separate intensity data and color data; and
  processing means for discarding color data substantially equally from the second data set and the fourth data set before combining them; and
  a decoder comprising: apparatus as claimed in claim 36.

38. A method comprising receiving a first set of pixel data in an intensity-color format for a first image, including first intensity data for a plurality of pixels and first color data for a first sub-set of the plurality of pixels and a second set of pixel data in the intensity-color format for a second image including second intensity data for the plurality of pixels and second color data for a second sub-set of the plurality of pixels,
  creating a third set of pixel data, for the first image in the intensity-color format, including intensity data and color data for each one of a third sub-set of the plurality of pixels, using a part of the first intensity data associated with the third sub-set of the plurality of pixels and the first color data, and
  creating a fourth set of pixel data for the second image, in an intensity-color format, including intensity data and color data for each one of a fourth sub-set of the plurality of pixels, using a part of the second intensity data associated with the fourth sub-set of the plurality of pixels and the second color data, the third and fourth sets of pixel data together representing a three dimensional viewable image.

39. A method as claimed in claim 38, wherein the plurality of pixels are arranged as an array having rows and columns, and wherein the third sub-set of the plurality of pixels comprises even alternate columns of the array of the plurality of pixels and the fourth sub-set of the plurality of pixels comprises the odd alternate columns of the array of the plurality of pixels.

40. A method as claimed in claim 38, wherein in the third set of pixel data, the color data for each group of adjacent ones of the first sub-set of the plurality of pixels is the same.

41. A method as claimed in claim 39, wherein each of the groups includes two pixels.

42. A method as claimed in claim 40, wherein the third data set, represents an array of pixels having rows and columns and each group of pixels is in the same column.

43. A method as claimed in claim 39, wherein the third set of pixel data has separate individual intensity data for each of the first sub-set of the plurality of pixels.

44. A method as claimed in claim 39, wherein in the fourth set of pixel data, the color data for each group of adjacent ones of the second sub-set of the plurality of pixels is the same.

45. A method as claimed in claim 44, wherein each of the groups includes two pixels.

46. A method as claimed in claim 44, wherein the fourth data set, represents an array of pixels having rows and columns and each group of pixels is in the same column.

47. A method as claimed in claim 38, wherein the fourth set of pixel data has separate individual intensity data for each of the second sub-set of the plurality of pixels.

48. A method as claimed in claim 38, wherein a ratio of intensity data to color data in the first and second data sets is 2:1 and a ratio of intensity data to color data in the third and fourth data sets is 1:2.

49. A method as claimed in claim 38, wherein the first intensity data includes intensity data for each of the plurality of pixels.

50. A method as claimed in claim 38, wherein the second intensity data includes intensity data for each of the plurality of pixels.

51. A method as claimed in claim 38, wherein the first sub-set and the second sub-set include the same pixels.

52. A method as claimed in claim 38, wherein the first data set represents the first image as if viewed from a first perspective and the second data set represents the second image as if viewed from a second, different perspective.

53. A method as claimed in claim 52, wherein the first and second perspectives are left and right parallax perspectives of the same image.

54. A method as claimed in claim 38, further comprising the step of converting the third set of pixel data from the intensity-color format into a red-green-blue format.

55. A method as claimed in claim 38, wherein the intensity-color format is a luminance-chrominance format.

56. Apparatus comprising:
  an input for receiving a data set that comprises a first set of pixel data in an intensity-color format for a first image, including first intensity data for a plurality of pixels and first color data for a first sub-set of the plurality of pixels and a second set of pixel data in the intensity-color format for a second image including second intensity data for the plurality of pixels and second color data for a second sub-set of the plurality of pixels; and
  processing means for creating a third set of pixel data, for the first image in the intensity-color format, including intensity data and color data for each one of a third sub-set of the plurality of pixels, using that part of the first intensity data associated with the third sub-set of the plurality of pixels and the first color data and creating a fourth set of pixel data for the second image, in an intensity-color format, including intensity data and color data for each one of a fourth sub-set of the plurality of pixels, using that part of the second intensity data associated with the fourth sub-set of the plurality of pixels and the second color data.

57. A system comprising:
(a) apparatus having:
  an input for receiving a first data set, representing pixels of a first image in a red-green-blue format, and for receiving a third data set, representing pixels of a second image in the red-green-blue format; and
  conversion means for converting the first data set to a second data set, representing pixels of the first image and having separate intensity data and color data and for converting the third data set to a fourth data set, representing pixels of the second image and having separate intensity data and color data; and
  processing means for discarding color data substantially equally from the second data set and the fourth data set before combining them; and
(b) as claimed in claim 56.

58. A memory storing a data set comprising:
  a first set of pixel data for a first image in an intensity-color format, including first intensity data for a plurality of pixels arranged as an array having rows and columns and first color data for a first sub-set of the plurality of pixels; and a second set of pixel data in the intensity-color colorspace for a second image including second intensity data for the same plurality of pixels and second color data for a second sub-set of the plurality of pixels the first and second sets of pixel data together representing a three dimensional viewable image.

59. Apparatus, comprising:

an input for receiving a first data set, representing pixels of a first image in a red-green-blue format, and for receiving a third data set, representing pixels of a second image in the red-green-blue format; and a processor for converting the first data set to a second data set, representing pixels of the first image and having separate intensity data and color data, for converting the third data set to a fourth data set, representing pixels of the second image and having separate intensity data and color data, and for discarding color data substantially equally from the second data set and the fourth data set before combining them.

60. The apparatus of claim 59, wherein the processor retains the intensity data of the second data set and the fourth data set in the combined data set.

61. Apparatus, comprising:

an input for receiving a data set that includes a first set of pixel data for a first image in an intensity-color format, including first intensity data for a plurality of pixels and first color data for a first sub-set of the plurality of pixels, and that includes a second set of pixel data for a second image in the intensity-color format, including second intensity data for the plurality of pixels and second color data for a second sub-set of the plurality of pixels; and a processor for creating a third set of pixel data in the intensity-color format for the first image, including intensity data and color data for each of the plurality of pixels, using the first intensity data and the first color data only.

62. System, comprising:

an encoder comprising:

an input for receiving a first data set, representing pixels of a first image in a red-green-blue format, and for receiving a third data set, representing pixels of a second image in the red-green-blue format; and a processor for converting the first data set to a second data set, representing pixels of the first image and having separate intensity data and color data, for converting the third data set to a fourth data set, representing pixels of the second image and having separate intensity data and color data, and for discarding color data substantially equally from the second data set and the fourth data set before combining them; and a decoder, comprising:

apparatus as claimed in claim 61.

63. Apparatus comprising:

an input for receiving a data set that comprises a first set of pixel data in an intensity-color format for a first image, including first intensity data for a plurality of pixels and first color data for a first sub-set of the plurality of pixels and a second set of pixel data in the intensity-color format for a second image including second intensity data for the plurality of pixels and second color data for a second sub-set of the plurality of pixels; and a processor for creating a third set of pixel data, for the first image in the intensity-color format, including intensity data and color data for each one of a third sub-set of the plurality of pixels, using that part of the first intensity data associated with the third sub-set of the plurality of pixels and the first color data and creating a fourth set of pixel data for the second image, in an intensity-color format, including intensity data and color data for each one of a fourth sub-set of the plurality of pixels, using that part of the second intensity data associated with the fourth sub-set of the plurality of pixels and the second color data.

64. A system comprising:

(a) apparatus having:

an input for receiving a first data set, representing pixels of a first image in a red-green-blue format, and for receiving a third data set, representing pixels of a second image in the red-green-blue format; and a processor for converting the first data set to a second data set, representing pixels of the first image and having separate intensity data and color data, for converting the third data set to a fourth data set, representing pixels of the second image and having separate intensity data and color data, and for discarding color data substantially equally from the second data set and the fourth data set before combining them; and (b) apparatus as claimed in claim 63.

* * * * *

UNITED STATES PATENT AND TRADEMARK OFFICE
CERTIFICATE OF CORRECTION

| | | |
|---|---|---|
| PATENT NO. | : 7,283,665 B2 | Page 1 of 1 |
| APPLICATION NO. | : 10/417423 | |
| DATED | : October 16, 2007 | |
| INVENTOR(S) | : Nobuyuki Suzuki | |

It is certified that error appears in the above-identified patent and that said Letters Patent is hereby corrected as shown below:

In column 10, line 53, claim 36, line 1, "Apoaratus" should be --Apparatus--.

In column 11, line 48, claim 41, line 1, "39" should be --40--.

In column 12, line 64, claim 57, line 16, after "(b)", --apparatus-- should be inserted.

Signed and Sealed this

Seventeenth Day of March, 2009

JOHN DOLL
*Acting Director of the United States Patent and Trademark Office*